(12) United States Patent
Haraguchi et al.

(10) Patent No.: US 6,525,840 B1
(45) Date of Patent: Feb. 25, 2003

(54) IMAGE FORMING APPARATUS (75) Inventors: Tsuyoshi Haraguchi, Hino (JP);
Yoshiaki Yamanaka, Hino (JP);
Tetsuya Kurimoto, Hino (JP); Yasuo Ohkoshi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/149,141

(22) Filed: Sep. 8, 1998

(30) Foreign Application Priority Data

Sep. 9, 1997 (JP) .............................................. 9-243655

(51) Int. Cl.⁷ ................................................ H04N 1/21
(52) U.S. Cl. ....................................... 358/296; 382/169
(58) Field of Search ................................. 358/296, 486, 358/474, 302, 298; 348/296; 382/169, 216; 355/40; 396/617

(56) References Cited

U.S. PATENT DOCUMENTS

| | | | |
|---|---|---|---|
| 4,591,903 A | | 5/1986 | Kawamura et al. ............ 358/75 |
| 4,751,583 A | | 6/1988 | Levine ......................... 358/256 |
| 4,769,660 A | * | 9/1988 | Heinrich ...................... 354/120 |
| 4,975,580 A | * | 12/1990 | Ohgida ......................... 358/302 |
| 5,470,429 A | * | 11/1995 | Shinomiya ................... 156/510 |
| 5,523,198 A | * | 6/1996 | Sakuma ........................ 430/509 |
| 5,532,731 A | | 7/1996 | Mihara et al. ............... 347/250 |
| 5,920,680 A | * | 7/1999 | Inoue .......................... 395/101 |
| 5,978,100 A | * | 11/1999 | Kinjo .......................... 358/453 |
| 5,978,555 A | * | 11/1999 | Inoue .......................... 595/109 |

FOREIGN PATENT DOCUMENTS

JP       6-347914        12/1994

OTHER PUBLICATIONS

European Search Report, Dec. 16, 1998.

* cited by examiner

*Primary Examiner*—Jerome Grant, II
*Assistant Examiner*—Negussie Worku
(74) *Attorney, Agent, or Firm*—Finnegan, Henderson, Farabow, Garrett & Dunner, L.L.P.

(57) ABSTRACT

In an image forming apparatus provided with an exposing section and a conveyor for conveying a plurality of light sensitive materials relative to the exposing section, the plurality of light sensitive materials are arranged in parallel in the conveying direction so that the exposing section is divided into plural exposing blocks corresponding to the plurality of light sensitive materials. There are provided a memory to memorize plural correction amounts each set based on a characteristic of one of the plurality of light sensitive materials, wherein the plural correction amounts are correlated with the plural exposing blocks in accordance with the corresponding light sensitive material; and a correcting section to correct the amount of light for each exposing block on the basis of the corresponding correction amount.

17 Claims, 9 Drawing Sheets

IMAGE FORMING APPARATUS

The present invention relates to an image forming apparatus and an image forming method.

In the conventional image forming wherein a light-sensitive material is exposed to light for obtaining a print, when a narrow photographic paper is exposed to light, it is impossible that all portions of an exposure area are used, which worsens exposure efficiency and causes a decline of processing capacity. If a plan is made for the narrow width from the beginning, to overcome the aforesaid problems, it is impossible to make large prints. It has therefore been proposed a technology wherein plural light-sensitive materials are exposed to light simultaneously in a single image exposure section, as disclosed in TOKKAIHEI No. 6-347914, for example.

However, when conducting exposure for plural rows as those stated above as plural light-sensitive materials, by cutting out a part of a series of light-sensitive material which is a roll of light-sensitive material in many cases, and by distributing it, there is hardly caused a problem. However, when conducting exposure for plural rows for each light-sensitive material from different rolls as plural light-sensitive materials, there have sometimes been caused slight differences in shade, density and gradation.

In particular, differences are conspicuous when the same scene is exposed on plural rows (in the case of making plural prints, which is also called printing for the number of prints when making photographic prints, in particular). This is considered to be caused by a slight difference in characteristics of a light-sensitive material which is caused despite the same type of light-sensitive material (light-sensitive materials having the same product name), by differences of the date of manufacture, place of manufacture and conditions for storage.

The problems stated above are naturally caused when the types of light-sensitive materials are different, and simultaneous exposure can not be conducted for a combination of a color light-sensitive material and a monochromatic light-sensitive material, and a combination of a reflection type light-sensitive material and a transmission type light-sensitive material, thus, there has been obtained no improvement in processing capability.

The present invention has been achieved in view of the problems mentioned above, and its object is to provide an image forming apparatus and an image forming method which make it possible to obtain an excellent print wherein a difference of types of light-sensitive materials and a slight difference of light-sensitive characteristics of light-sensitive materials are eliminated, even when light-sensitive materials in plural rows are exposed simultaneously.

The invention is structured as follows to solve the problems stated above and to attain the object mentioned above.

Item 1. An image forming apparatus having therein an exposure section which conducts exposure on plural light-sensitive materials arranged in parallel with a single exposure system, a memory section which stores a plurality of correction amounts established in accordance with an exposure area in the direction perpendicular to the direction of rows of the light-sensitive materials and established based on characteristics of the light-sensitive material, and a correction-processing section which corrects so that quantity of light of the exposure section may be influenced in accordance with an exposure area based on the aforesaid correction amount.

Due to the structure of Item 1, it is possible to provide an image forming apparatus wherein exposure on plural rows of light-sensitive materials makes it possible to correct for each row while keeping high efficiency of an image forming apparatus such as a printer even when a different type of light-sensitive material in each row is exposed, and thereby to obtain an excellent print in each row, and wherein it is possible to obtain a print with stable print quality wherein, when a slight difference in light-sensitive coloring characteristics exists despite the same type of light-sensitive materials, or when a slight difference is caused, the slight difference is eliminated.

A single exposure system mentioned in the invention means a system having the structure for exposure that is necessary for image forming from a light-sensitive material such as one to project an image formed on a photographic film on a light-sensitive material for exposure, and one to divide image information into many pixels to expose a light-sensitive material to the pixels, and an example thereof in the case of exposure to a color light-sensitive material is an exposure system having light sources capable of conducting exposure respectively for blue, green and red.

However, it is not always necessary to have the structure having plural amounts of correction for exposure of all colors, and for example, the structure having plural amounts of correction for exposure of only green can offer the effect of the invention.

Incidentally, an exposure area mentioned in the invention means a range of exposure in the direction crossing the direction of rows necessary for exposure to a light-sensitive material in each row and for image forming, and its size is established in accordance with a width in the direction crossing the direction of rows of a light-sensitive material in each row.

A size of the exposure area does not necessarily be established to be the same as a width of a light-sensitive material, and it can be set either slightly greater or slightly smaller, and each exposure area can further be overlapped each other to the extent having no influence on image forming.

When an exposure system is a scanning type exposure system, the aforesaid exposure area is set as a block which is formed by dividing the direction crossing the direction for conveying light-sensitive materials in plural rows, namely the so-called scanning direction into a block with a unit of prescribed number of pixels.

Item 2. The image forming apparatus according to Item 1, which has a means in which the aforesaid correction processing section converts image data based on the amount of correction, and corrects so that the quantity of light is influenced.

Owing to the structure of Item 2, it is possible to simplify the structure of the image exposure section more than correcting a quantity of light of a light source directly, and even when a size and the number of exposure areas to which different amounts of correction are to be applied, it is possible to cope with it without changing the structure of the image exposure section.

Item 3. The image forming apparatus according to Item 1 or Item 2, wherein plural magazines each housing therein the light-sensitive material are provided, and the exposure area is determined in accordance with the position of the mounted magazine.

Owing to the structure of Item 3, it is not necessary to detect the width of a light-sensitive material each time and thereby to establish an exposure area to which an amount of correction is to be applied, and it is possible to simplify the apparatus by employing the structure wherein when two magazines are set for the maximum area where exposure is possible at the image exposure section, for example, the exposure section is divided into two exposure areas and an amount of correction can be applied to each exposure area.

Item 4. The image forming apparatus according to either one of Item 1–Item 3 having therein plural magazines each housing therein the light-sensitive material and having discrimination information with which each magazine can be discriminated and a discrimination information reading means which reads the discrimination information, wherein the discrimination information and the amount of correction are stored in the memory section to be corresponded each other, and the amount of correction is established to correspond to the exposure area based on the discrimination information read by the discrimination information reading means.

The structure of Item 4 makes it possible to set the prescribed exposure area to the prescribed amount of correction immediately and thereby to improve work efficiency even when magazines are used by changing their rows for setting or when light-sensitive materials are used by switching the width to a wide width or to a narrow width, because the amount of correction can be corresponded to discrimination information of the magazine which houses a light-sensitive material. Incidentally, when the discrimination information is made to be one including width information of a light-sensitive material to be loaded and a type of a magazine, namely the types such as a magazine for a single row exposure, a magazine for two-row exposure, or a magazine for three-row exposure, setting of an exposure area to which an amount of correction for the magazine is to be applied is made simple, which is preferable.

Item 5. The image forming apparatus according to Item 4 wherein the amount of correction is calculated from a print formed by giving exposure conducted by the exposure section to a light-sensitive material loaded in the magazine, and information based on discrimination information of the magazine is given to the print for calculating the amount of correction.

In the structure of Item 5, correspondence between a magazine and a print is not mistaken even when an amount of correction is obtained from prints of light-sensitive materials in plural rows simultaneously, thus setting of wrong amount of correction can be prevented.

Item 6. The image forming apparatus according to Item 5 wherein density information on a print for calculation of the amount of correction and information based on the discrimination information are read optically, and thereby the amount of correction is calculated based on the density information, and the discrimination information and the amount of correction are stored in the memory section to be corresponded.

The structure of Item 6 makes it possible to take correspondence between an amount of correction based on density information and discrimination information automatically and thereby to further prevent an error in setting up.

Item 7. An image forming apparatus wherein there are provided an exposure section wherein plural light-sensitive materials arranged in parallel are exposed by a single exposure system, a same finish setting means which sets a requirement for making plural prints formed to be in the same finish, and a control section which controls so that light-sensitive materials in the same row may be exposed to plural images on which the same finish is set.

Owing to the structure of Item 7, even when light-sensitive materials in plural rows are slightly different in terms of their light-sensitive and coloring characteristics, it is possible to provide uniform prints wherein delicate difference in shade and density difference on finished prints are eliminated when plural prints are required to be made from the same image.

Item 8. The image forming apparatus according to Item 7, wherein the setting for the same finish is made by obtaining either one of information of the number of prints, information of approximate scenes and information of continuous photographing scenes.

The structure of Item 8 makes it possible to provide uniform prints wherein slight difference in light-sensitive characteristics is eliminated when plural prints are made from the same image, when printing approximate scenes in which images look like, and when images are those obtained through continuous photographing.

Item 9. The image forming apparatus according to Item 7 or Item 8, wherein an inputting means for setting the same finish is provided.

The structure of Item 9 makes it possible for an operator of the image forming apparatus to set the same finish for the image, for example, to make prints wherein conditions of using the apparatus are taken into consideration, and makes it possible to attain improvement of print quality while keeping the production efficiency.

Item 10. The image forming apparatus according to either one of Item 7–Item 9, wherein there is provided a print sorting means having therein a means to gather plural prints on which the same finish is set at the prescribed position.

The structure of Item 10 makes it possible to collectively obtain prints to which the same finish is required out of a large number of prints, and thereby to improve efficiency of print sorting work.

Item 11. An image forming method to expose plural light-sensitive materials arranged in parallel with a single exposure system, wherein plural groups of correction amount based on characteristics of the light-sensitive materials are stored, and the correction is made to influence on a quantity of light of the exposure system by applying correction amount in accordance with an exposure area to the light-sensitive material in the exposure system so that exposure may be conducted.

Due to the structure of Item 11, it is possible to provide an image forming method wherein exposure on plural rows of light-sensitive materials makes it possible to correct for each row while keeping high efficiency of an image forming apparatus such as a printer even when a different type of light-sensitive material in each row is exposed, and thereby to obtain an excellent print in each row, and wherein it is possible to obtain a print with stable print quality wherein, when a slight difference in light-sensitive coloring characteristics exists despite the same type of light-sensitive materials, or when a slight difference is caused, the slight difference is eliminated.

Item 12. The image forming method according to Item 11 wherein the correction having an influence on the quantity of light is made through conversion of image data based on the correction amount.

In the structure of Item 12, it is possible to simplify the structure of an image exposure section rather than to correct a quantity of light of a light source directly, and when sizes and the number of exposure areas to which different correction amounts are to be applied are changed, it is possible to cope with it without changing the structure of the image exposure section.

Item 13. An image forming method to expose plural light-sensitive materials arranged in parallel with a single exposure system, wherein there is established a requirement to make plural prints formed to be of the same finish, and light-sensitive materials in the same row are exposed to plural images on which the same finish has been set.

In the structure of Item 13, it is possible to provide uniform prints wherein delicate difference in shade and density difference of finished prints are eliminated in the case of requirement to make plural prints from the same image, even when light-sensitive materials in plural rows are slightly different in terms of light-sensitive and coloring characteristics.

Figure 1:
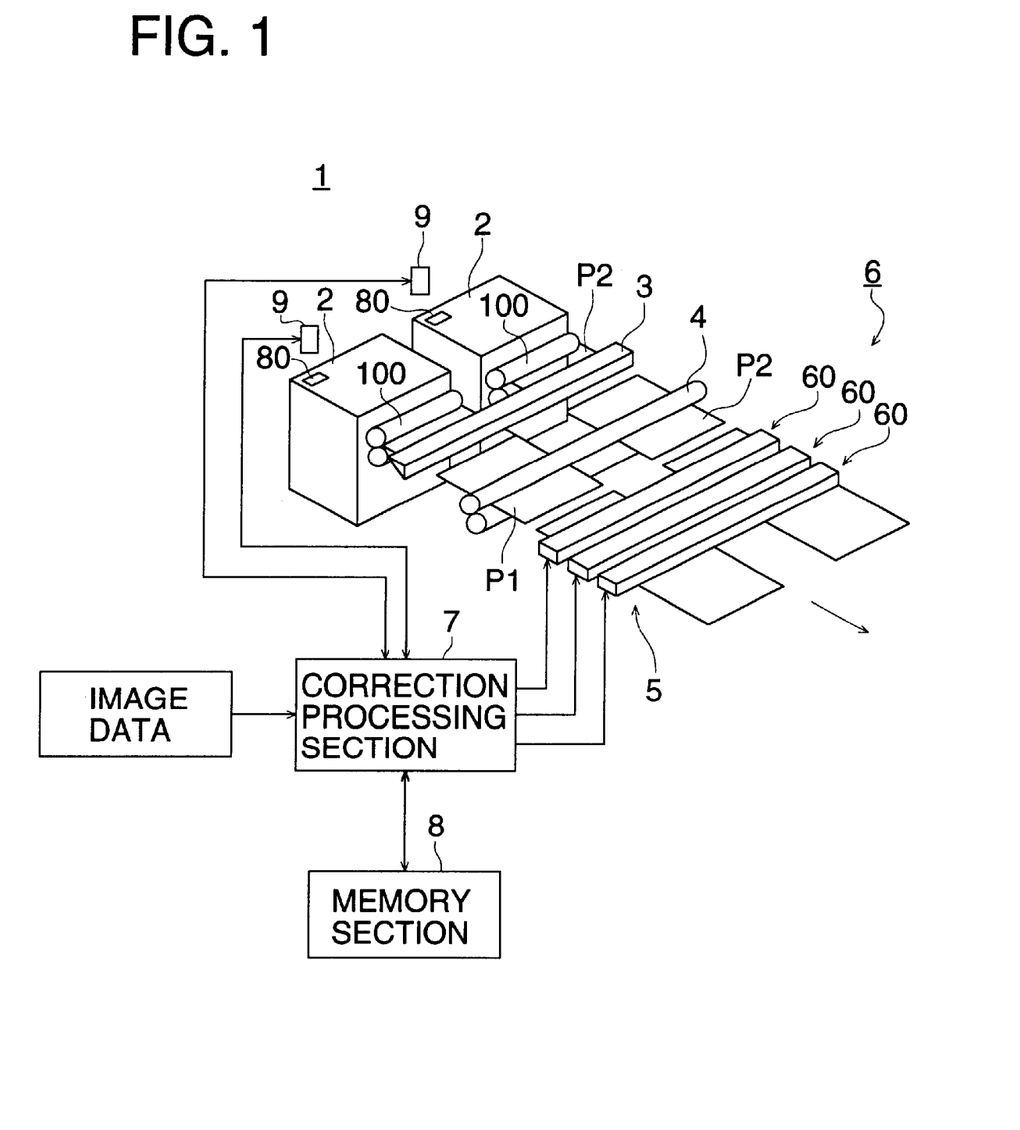
FIG. 1 is a schematic structure diagram of an image forming apparatus
Figure 2:
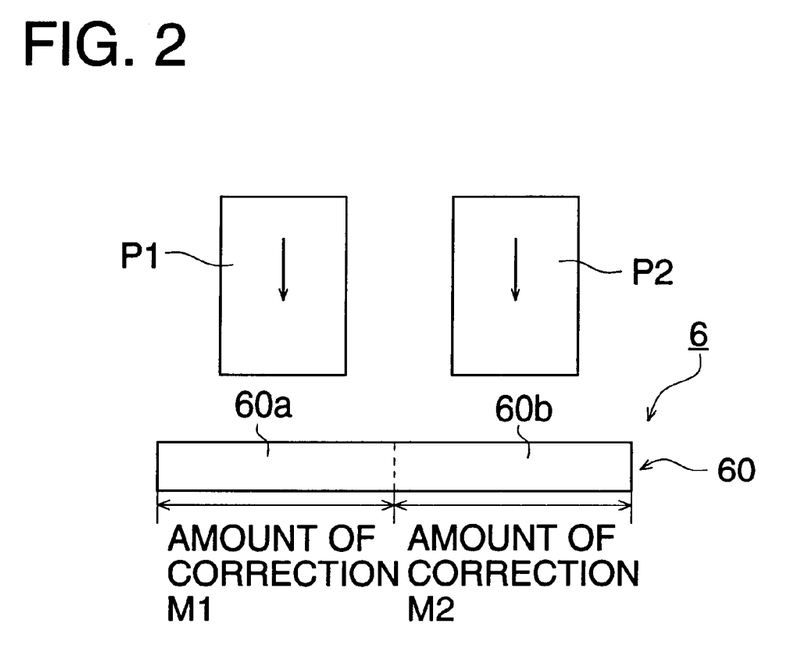
FIG. 2 is a diagram showing an amount of correction which is based on characteristics of light-sensitive materials.
Figure 3:
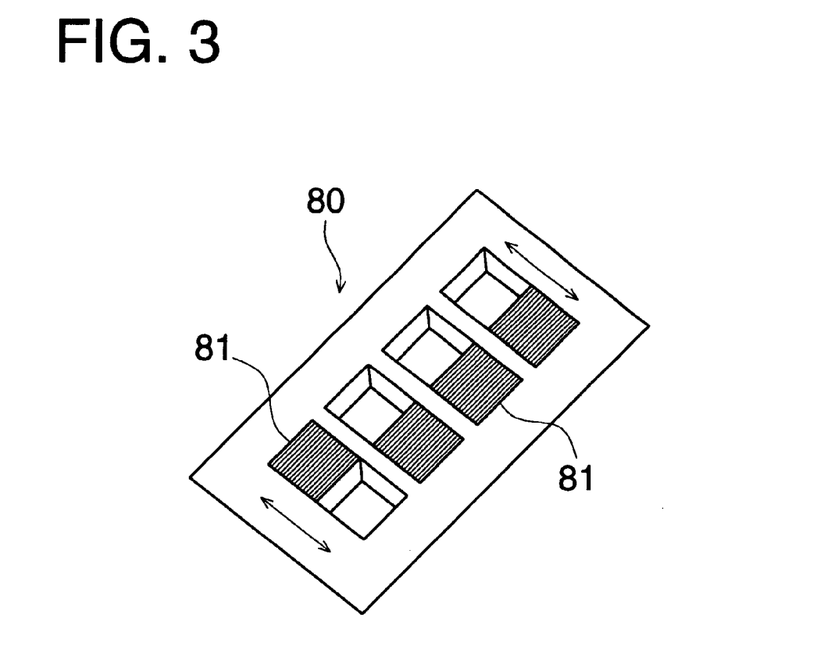
FIG. 3 is a diagram showing discrimination information of a magazine.
Figure 4:
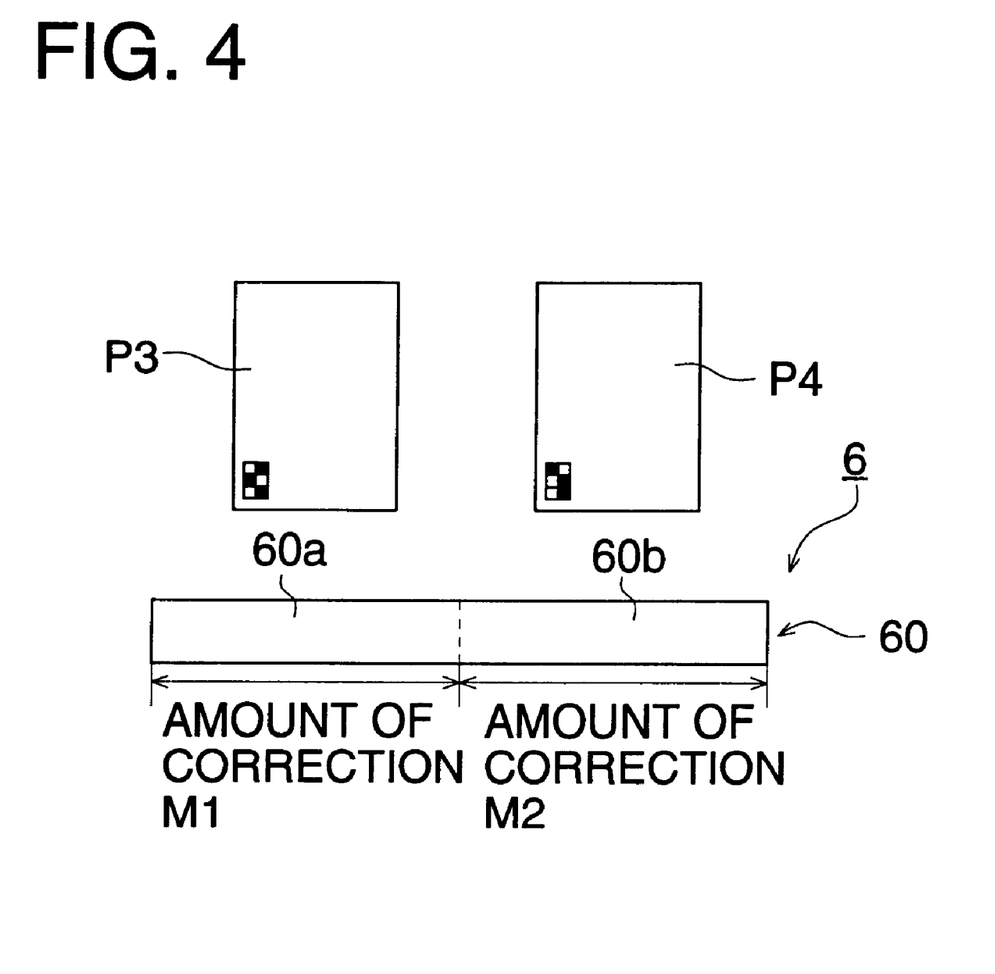
FIG. 4 is a diagram showing discrimination information of a print for calculating an amount of correction.

An embodiment of an image forming apparatus of the invention will be explained as follows. First, FIGS. 1–4 show the embodiment wherein exposure is conducted by an array-shaped light source for exposure, and FIG. 1 is a schematic structure diagram of the image forming apparatus, FIG. 2 is a diagram showing an amount of correction which is based on characteristics of light-sensitive materials, FIG. 3 is a diagram showing discrimination information of a magazine, and FIG. 4 is a diagram showing discrimination information of a print for calculating an amount of correction.

On image forming apparatus 1, there are set two magazines 2 loaded with two rolls of light-sensitive materials. Light-sensitive materials P1 and P2 are respectively fed out by rollers 100 from these two magazines 2 set in parallel, and they are cut by cutter 3 to prescribed lengths. Sheet-shaped light-sensitive materials P1 and P2 thus cut are conveyed by conveyance roller 4 while forming two rows. In conveyance path 5 for the light-sensitive materials P1 and P2, there is arranged single image exposure section 6 which conducts exposure on light-sensitive materials P1 and P2 in two rows.

Single image exposure section 6 is composed of print heads 60 for array exposure which are respectively for a blue light source for yellow color forming, a green light source for magenta color forming and a red light source for cyan color forming, and light-sensitive materials P1 and P2 exposed to light by the image exposure section 6 are conveyed to a developing section. The print head 60 of the image exposure section 6 is controlled in terms of quantity of its emitted light by correction processing section 7, and exposure is controlled so that desired prints may be obtained based on the inputted image data.

On the image forming apparatus 1, there is provided memory section 8 having therein plural correction amounts which correspond to characteristics of light-sensitive materials P1 and P2. Correction processing section 7 receives input of image data to which the light-sensitive materials P1 and P2 are to be exposed, then conducts correction to have an influence on a quantity of light in accordance with a position of exposure, based on correction amounts M1 and M2 stored in memory section 8 as shown in FIG. 2, and conducts exposure.

Though light-sensitive materials P1 and P2 in plural rows are exposed to light by single image exposure section 6 as stated above, it is possible to obtain excellent prints without deteriorating exposure efficiency, because each of correction amounts M1 and M2 for obtaining excellent prints respectively from light-sensitive materials P1 and P2 is set for the exposure.

Incidentally, in the present example, with regard to light-sensitive materials P1 and P2, there were established correction amounts M1 and M2 for those whose light-sensitive characteristics are quite different such as monochromatic light-sensitive material whose processing-step thereafter is changed when necessary, color light-sensitive material, negative type light-sensitive material, positive type light-sensitive material, silver chloro-bromide light-sensitive material and high-chloride-containing silver halide light-sensitive material, and those whose types of light-sensitive material are different such as those having different types of base like a transparent type, a reflection type and a translucent type, those having different surface characteristics like a glossy paper, a semi-glossy paper and a mat paper and those mainly having different gradation characteristics like paper for amateur print and paper for proprint, and exposure was conducted under combinations of various types, thereby excellent prints were obtained at high efficiency.

Further, with regard to light-sensitive materials P1 and P2, there were established correction amounts M1 and M2 for those whose types of light-sensitive material and product names are the same but emulsion numbers or expiration dates are different, and exposure was conducted from the same image under combinations of various types. As a result, it was possible to obtain excellent prints wherein slight differences in light-sensitive characteristics are eliminated and finishes are almost uniform.

Incidentally, with regard to a method to give correction amounts M1 and M2, a part of light emitted from a light source is monitored by a light quantity sensor, and in the case of a system to transfer feedback to a voltage of a light source, a correction amount can be applied directly to the voltage, or in the case of the structure wherein a light quantity cut filter can be inserted between a light source and a light-sensitive material, density of a filter and time of insertion of the filter can be established based on the correction amount, and further, in the case of the structure wherein exposure is conducted based on image data as in the present example, exposure can be conducted by converting image data directly with a correction amount corresponding to the exposure position after decision of the light-sensitive material to be exposed by an image.

Incidentally, a method of the conversion in this case includes a method to convert data through simple addition, subtraction, multiplication and division, using a software and a circuit for image processing, and a method to convert by the use of LUT (Look Up Table).

Though an arrangement of light-sensitive materials in two rows is shown in this example, it is also possible to obtain the same effect by having plural correction amounts even for three rows or more.

Even when a width of a light-sensitive material in each row is different from others, it is possible to obtain the same effect by making a size of each divided exposure area to be changeable and by causing it to correspond to the correction amount.

Image forming apparatus 1 is provided with plural magazines 2 containing respectively plural light-sensitive materials P1 and P2, and each of magazines 2 is provided with discrimination information 80 which can specify the magazine 2. The discrimination information 80 is structured as shown in FIG. 3, and it is composed of plural switches 81 each being composed of a white board and a black moving board which slides on the white board. The switch 81 is set so that magazine 2 housing therein a different light-sensitive material may be set differently, and this setting is read by discrimination information detecting sensor 9 such as a light quantity sensor, whereby coded information is transmitted to control section 7.

Since the aforesaid magazine 2 is the so-called reusable magazine which is loaded again with a new light-sensitive material after the light-sensitive material loaded therein has been used up, the discrimination information 80 is structured to be a group of variable switches. However, it is also possible to have the structure wherein a seal on which barcodes, symbols or characters, for example, are printed is pasted to be read at a prescribed position on the magazine, and it is further possible to have the structure wherein the aforesaid seal is supplied to accompany a light-sensitive material, and the seal is pasted at a prescribed position on the magazine when the light-sensitive material is used.

When using an expendable magazine which is different from the foregoing, it is possible to print bar-codes, symbols or characters directly on the magazine to be read.

It is also possible to replace the discrimination information 80 representing a group of the variable switches mentioned above with a group of DIP-switches which are read electrically to be distinguishable information.

Based on correspondence between a correction amount based on light-sensitive characteristics of the loaded light-sensitive material set and stored in advance and the discrimination information 80 of magazine 2, correction processing section 7 receives the discrimination information 80 from magazine 2 and establishes the correction amount.

Due to this, even when the position for setting magazine 2 is switched and thereby the conveyance positions for light-sensitive materials P1 and P2 are replaced each other, exposure areas to which correction amounts M1 and M2 are applied are switched promptly and excellent prints can be obtained immediately.

Even when conducting the exposure on a wide light-sensitive material at the same exposure section in place of exposure on light-sensitive materials in plural rows which will be explained later with reference to FIG. 5 and FIG. 6, it is possible to set the optimum correction amount to each exposure area promptly through replacement of magazines.

As a method to establish correspondence between a correction amount and discrimination information, it is possible to provide by attaching discrimination information on the occasion of factory shipments, or to supply a storage medium which stores therein setting information and to store in the memory section in an image forming apparatus through the aforesaid storage medium. In the case of a light-sensitive material which relates to change with time and requires development processing, it is preferable to set in the following method, taking fluctuation in light-sensitive coloring characteristics caused by development and further difference in image forming apparatuses into consideration. Namely, there is used a light-sensitive material loaded in magazine 2 which is subjected to exposure at the reference correction amount from a prescribed image, in particular, from prescribed image data in the case of an image forming apparatus in the present embodiment, and it is preferable that density information of the print thus obtained is measured by a densitometer, a colorimeter or a scanner, then the correction amount which makes the aforesaid measured value to be the desired color and density is calculated and is stored to be corresponded to discrimination information.

Further, it is preferable that the aforesaid operations, namely the so-called set-up operations are conducted collectively for plural magazines prior to or after ordinary print making operations, because the set-up operations conducted during ordinary print making operations sometimes lower work efficiency. It is preferable also from this viewpoint that plural correction amounts are stored to be corresponded to discrimination information.

As an image for the set-up mentioned above, it is possible to use those of a type used commonly such as a gray scale or a color chart, and when setting up a light-sensitive material which is not greatly different in terms of types from the light-sensitive material used for determining the reference correction amount, it is possible to use a chart having a less density point to adjust only color balance and density. As a means to calculate a correction amount from measurement data of prints, an apparatus that is independent from an image forming apparatus can be used, and it is possible either to cause only a correction amount to be inputted and stored in the image forming apparatus or to input measurement data of prints and thereby to calculate the correction amount in the image forming apparatus.

It is further structured, as shown in FIG. 4, so that print discrimination information 81 based on discrimination information 80 of magazine 2 may be given to prints P3 and P4 for calculating a correction amount through exposure, and the print discrimination information 81 may be inputted simultaneously when measurement data of set-up chart on a print or the correction amount calculated from the measurement data is inputted in the image forming apparatus.

A method of inputting print discrimination information 81 includes, in addition to a method of inputting automatically with an optical reading device, a method to input manually through key board operations. When inputting automatically, it is preferable, from a viewpoint of easy automatic recognition of symbols, that print discrimination information 81 is represented by black and white checkered patterns or bar-codes as those in the present example, while when inputting manually, it is preferable that the print discrimination information 81 is a character or a numeral which can easily be judged intuitively.

Due to the structure stated above, even when prints for set-up come out of plural magazines almost simultaneously to shorten the time required by repeating the set-up operations for each magazine, it is possible to prevent that correspondence between a magazine and a print is mistaken and that a correction amount is established under the mistaken correspondence.

When image exposure section 6 is represented by print head 60 wherein plural recording elements are arranged in a form of an array as in the present example, this print head 60 is divided into plural blocks 60a and 60b for plural recording elements as shown in FIG. 2, and each of block 60a and block 60b is corrected based on the correction amount corresponding to characteristics of each of light-sensitive materials P1 and P2 corresponding to the exposure position, so that a quantity of light is influenced, thus, excellent prints wherein a difference between light-sensitive characteristic of light-sensitive material P1 and that of light-sensitive material P2 is taken into consideration.

Figure 5:
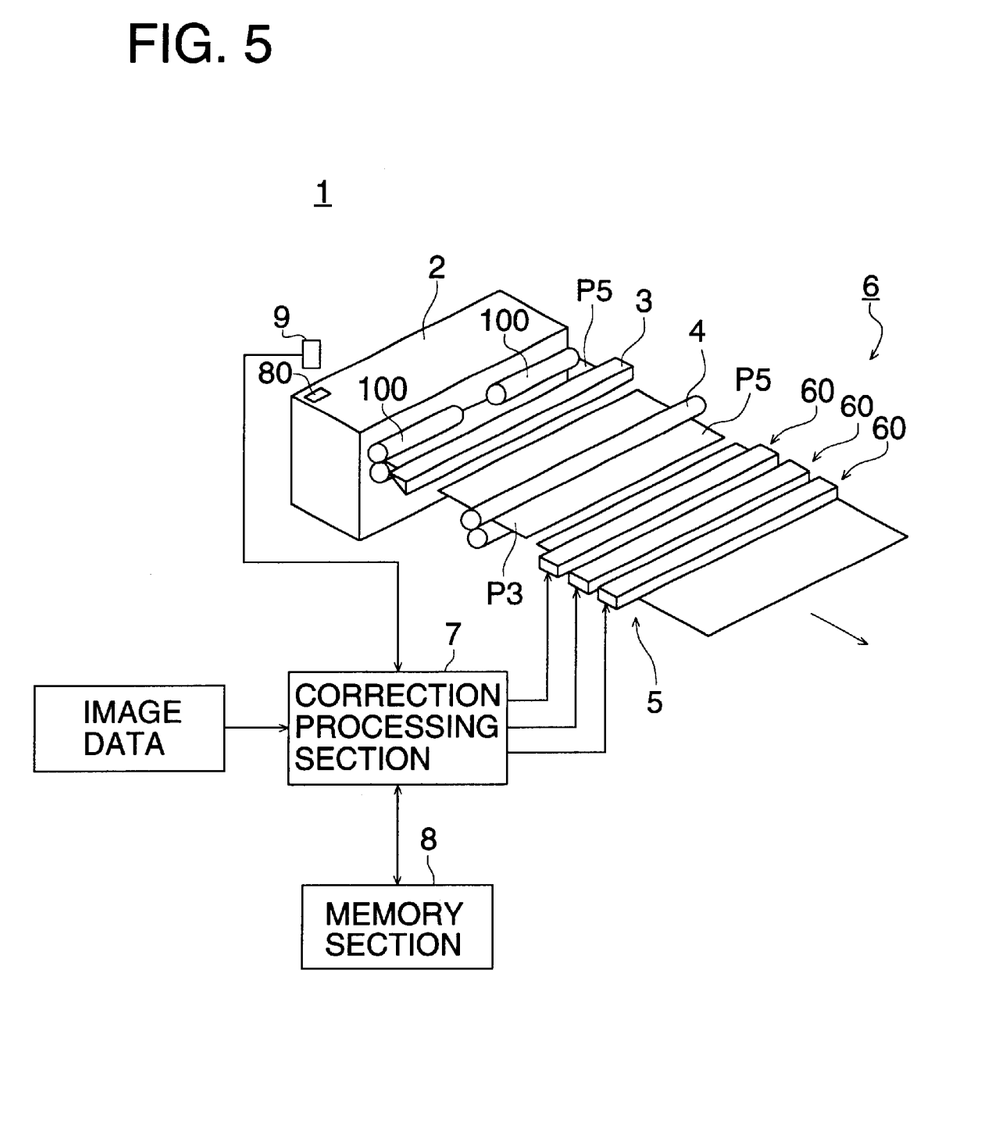
FIG. 5 is a schematic structure diagram of an image forming apparatus wherein one magazine is set up.
Figure 6:
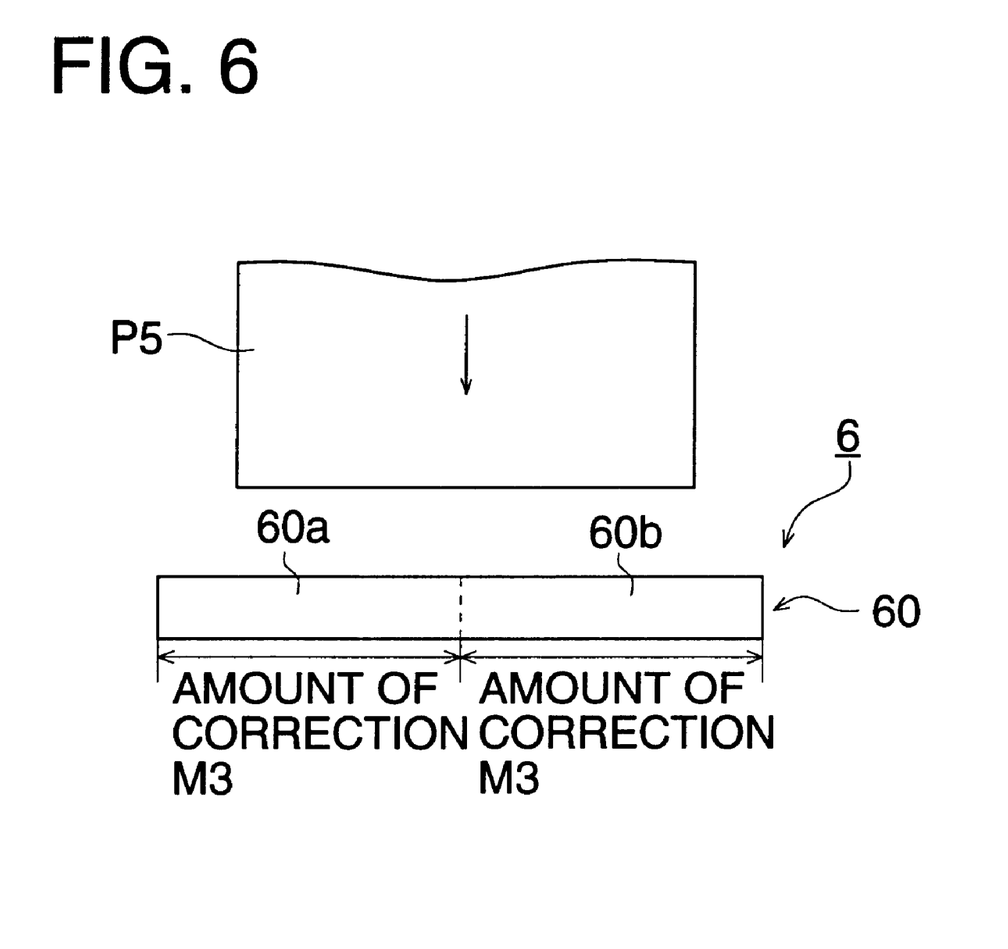
FIG. 6 is a diagram showing an amount of correction based on characteristics of a light-sensitive material.

As shown in FIGS. 5 and 6, it is possible to set one magazine 2 on the image forming apparatus, and light-sensitive material P5 having a wide width is fed out of the magazine 2 by cooperation of rollers 100, then is cut by cutter 3 into a prescribed length, and conveyed by conveyance roller 4. In this case, correction processing section 7 receives input of image data to be exposed on light-sensitive material P5, and conducts correction and exposure based on correction amount M3 stored in memory section 8 so that a quantity of light may be influenced, as shown in FIG. 6.

Figure 7:
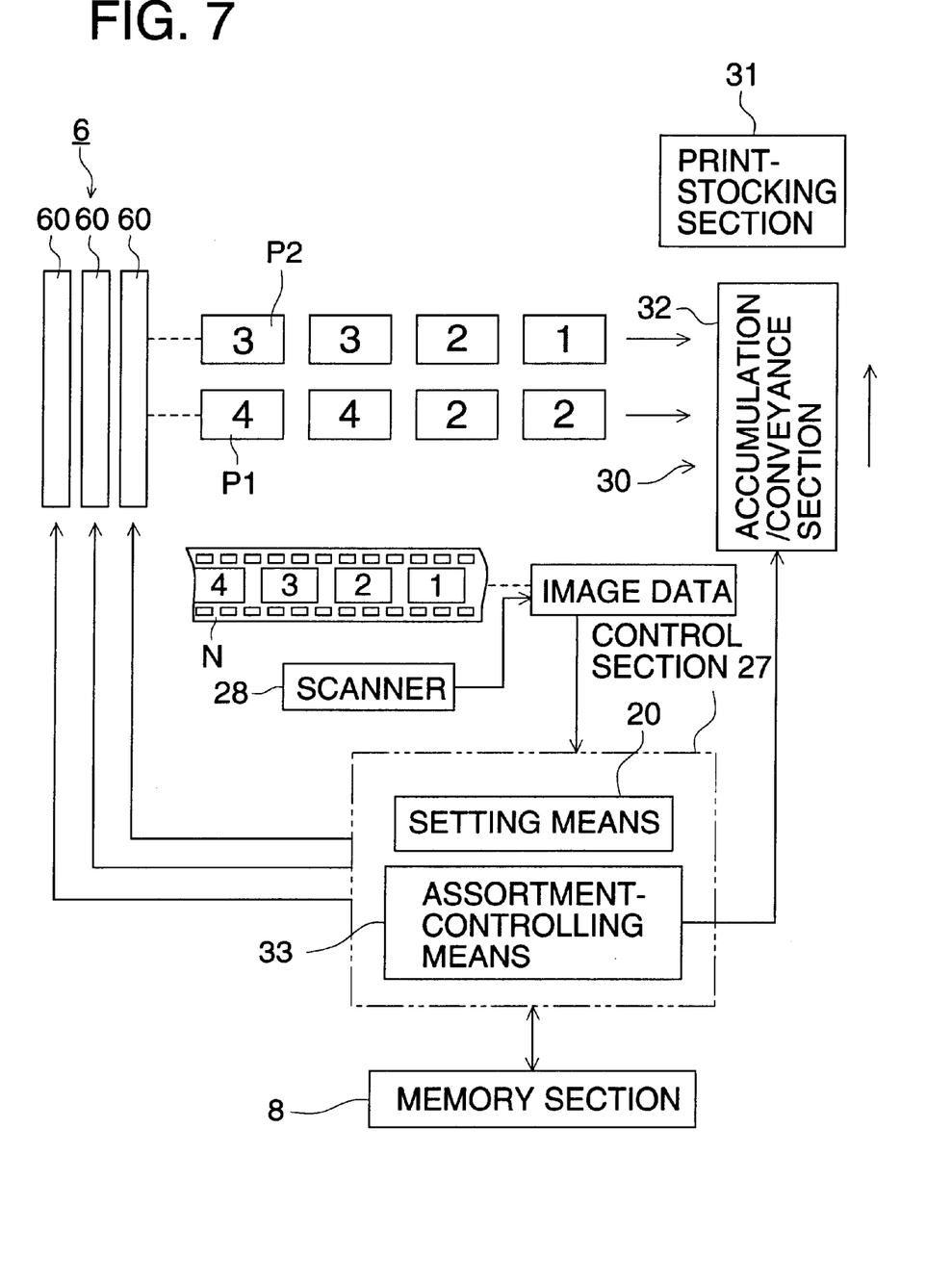
FIG. 7 is a schematic structure diagram of another embodiment of the image forming apparatus.

FIG. 7 is a schematic structure diagram of another embodiment of the image forming apparatus. On the image forming apparatus in this embodiment, light-sensitive materials P1 and P2 in plural rows are exposed by single image exposure section 6, and control section 27 has therein setting means 20 which sets the images required to be of the same finish.

The image forming apparatus is structured to adjust an exposure position and an exposure order so that the images required to be of the same finish may be exposed on light-sensitive materials in the same row. For example, when making two prints for each scene, frame numbers 2 and 4 are arranged on the side of light-sensitive material P1 and frame numbers 1 and 3 are arranged on the side of light-sensitive material P2 as shown in FIG. 7, and exposure is conducted for the same row when making plural prints from the same image, even when light-sensitive characteristics of light-sensitive materials for each row are different slightly from others, thereby, it is possible to provide prints which are almost uniform wherein differences of a color and density of finished prints are inconspicuous, compared with an occasion wherein frame numbers are dispersed so that the frame numbers 1, 2, 3 and 4 are arranged respectively on the side of light-sensitive material P1 and on the side of light-sensitive material P2.

Figure 8:
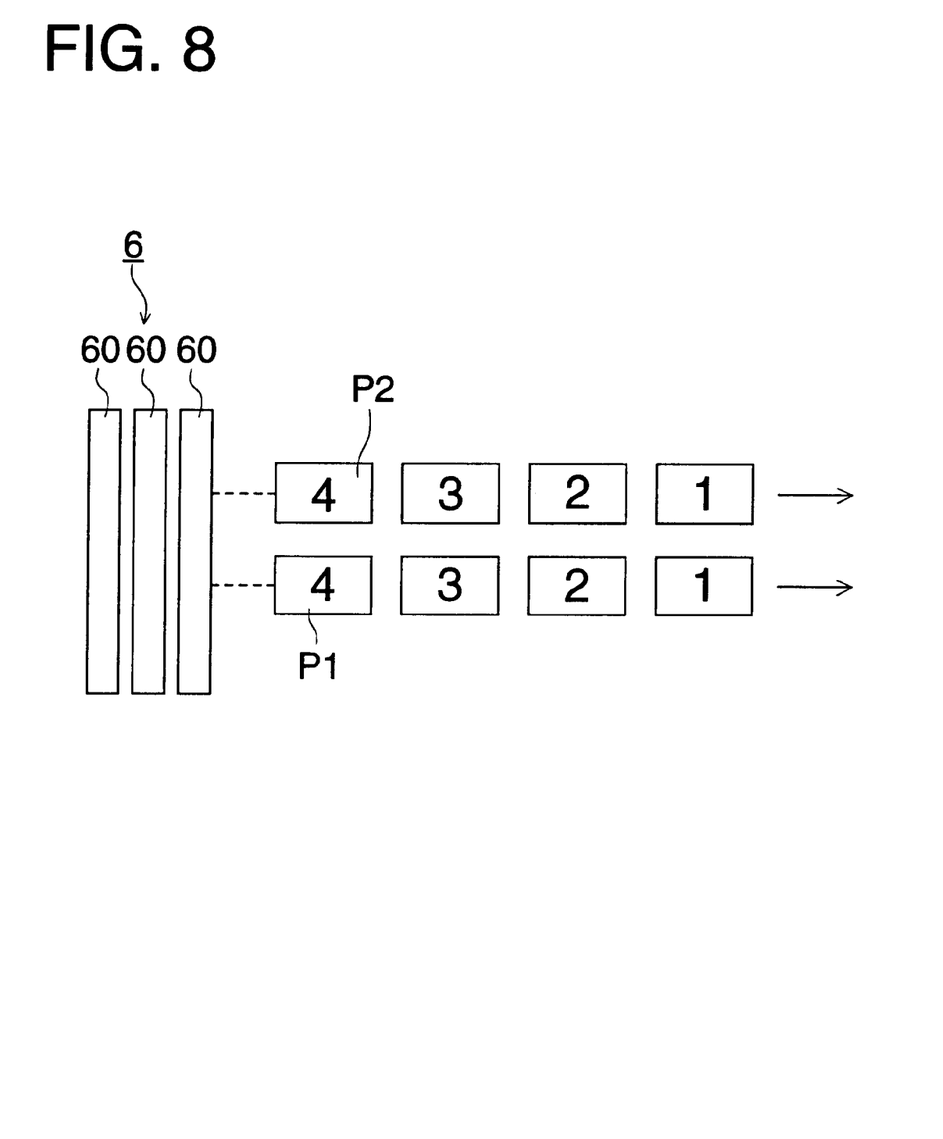
FIG. 8 is a diagram showing a comparative example for exposure of an image required to be of the same finish.

On the image forming apparatus in the present embodiment, adjustment for a position and an order of exposure is made by adjustment for a composing position and its order for image data in the course of composing image data into image data for exposure use. To be concrete, when making two prints from each frame of negative film N, there is conducted control to obtain prints wherein image data 1 from frame 1 to begin with are read by scanner 28 as shown in FIG. 8, then two of them are composed and exposed, and frame 2 and thereafter are exposed successively in the same way without conducting control to obtain prints, and after receiving image data 1 and image data 2 respectively from frame 1 and frame 2 as shown in FIG. 7, these are composed and exposed twice to the same image data for exposure use, and frame 3 and thereafter are exposed in succession in the same way.

Setting means 20 sets images requiring the same finish, and the images requiring the same finish include, for example, approximate scenes, continuous photographing scenes and slope scenes, in addition to processing of plural sets of prints mentioned above. A method to set the foregoing includes a method to set automatically by receiving information of the number of sets for prints to be made and by judging as an approximate sheet based on a pattern of shapes and colors of the image, a method wherein an operator of the apparatus sets manually by observing images directly, and by displaying image data read by a scanner on a CRT monitor, and a method wherein optical information, magnetic information and information of continuous photographing scenes are recorded on a film automatically or manually by a photographer in the course of photographing and the recorded information is structured so that it can be utilized on the part of the image forming apparatus.

It is also possible to structure so that setting is switchable whether to print with plural rows merely used simultaneously by an operator of the apparatus or to print using only one row, for example, to switch to plural rows when the apparatus is busy or to switch to a single row when the apparatus is not busy, or to switch to a single row mode for the customer requesting quality of finish strictly.

It is possible to establish a correction amount for each of plural exposure areas stated above to use through combination with the structure for exposure, and in this case, even when the correction amount can not be set, print quality is not deteriorated, which is preferable.

The image forming apparatus shown in FIG. 7 has assorting section 30 composed of prints formed from the images requiring the same finish. The assorting section 30 is composed of accumulation conveyance section 32 which accumulates prints temporarily and conveys finally to print-stocking section 31 and assortment-controlling means 33 which receives information from setting means 20 and controls operations of the accumulation conveyance section 32.

Figure 9A:
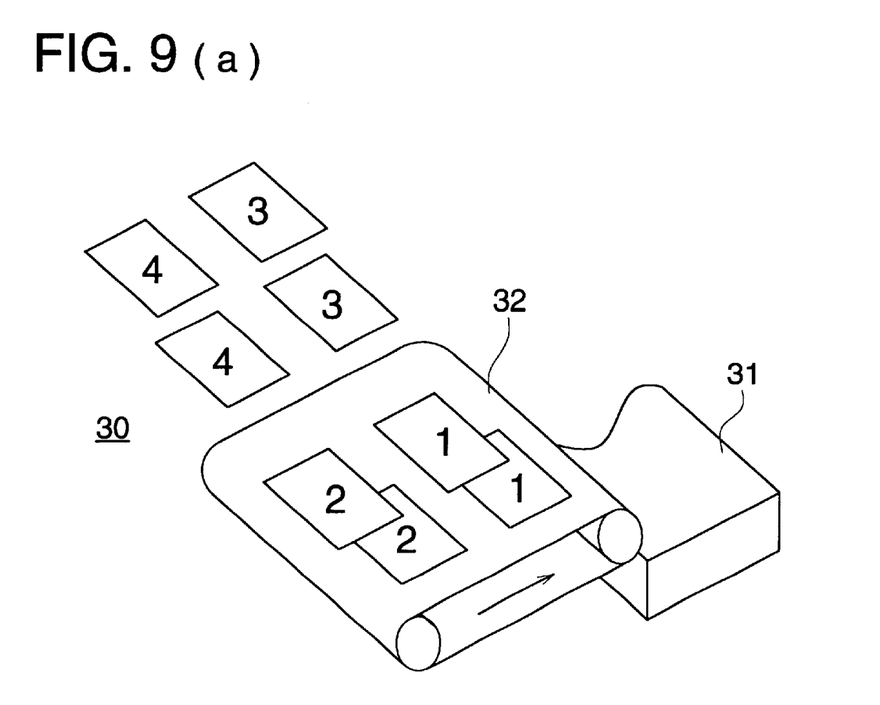
FIGS. 9(a) and 9(b) are diagrams illustrating the sorting of prints from the image required to be of the same finish.
Figure 9B:
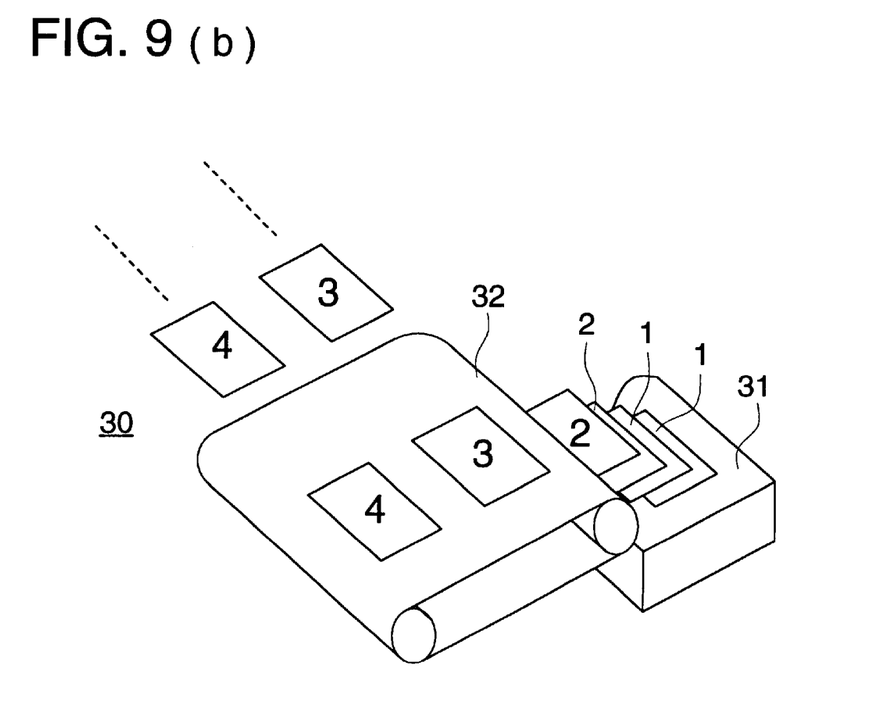

As shown in FIG. 9, the assorting section 30 temporarily accumulates prints made from images requiring the same finish in accumulation conveyance section 32, and it is controlled to drive once to the print-stocking section 31 side after waiting until two prints are accumulated in the accumulation conveyance section 32, because two prints are required to be made from the same image each time in this case. Even when prints from images requiring the same finish are made from the same row by repeating the same operations, the prints thus made can compare with many prints, which results in easy handling even for confirmation of the number of prints.

Figure 10:
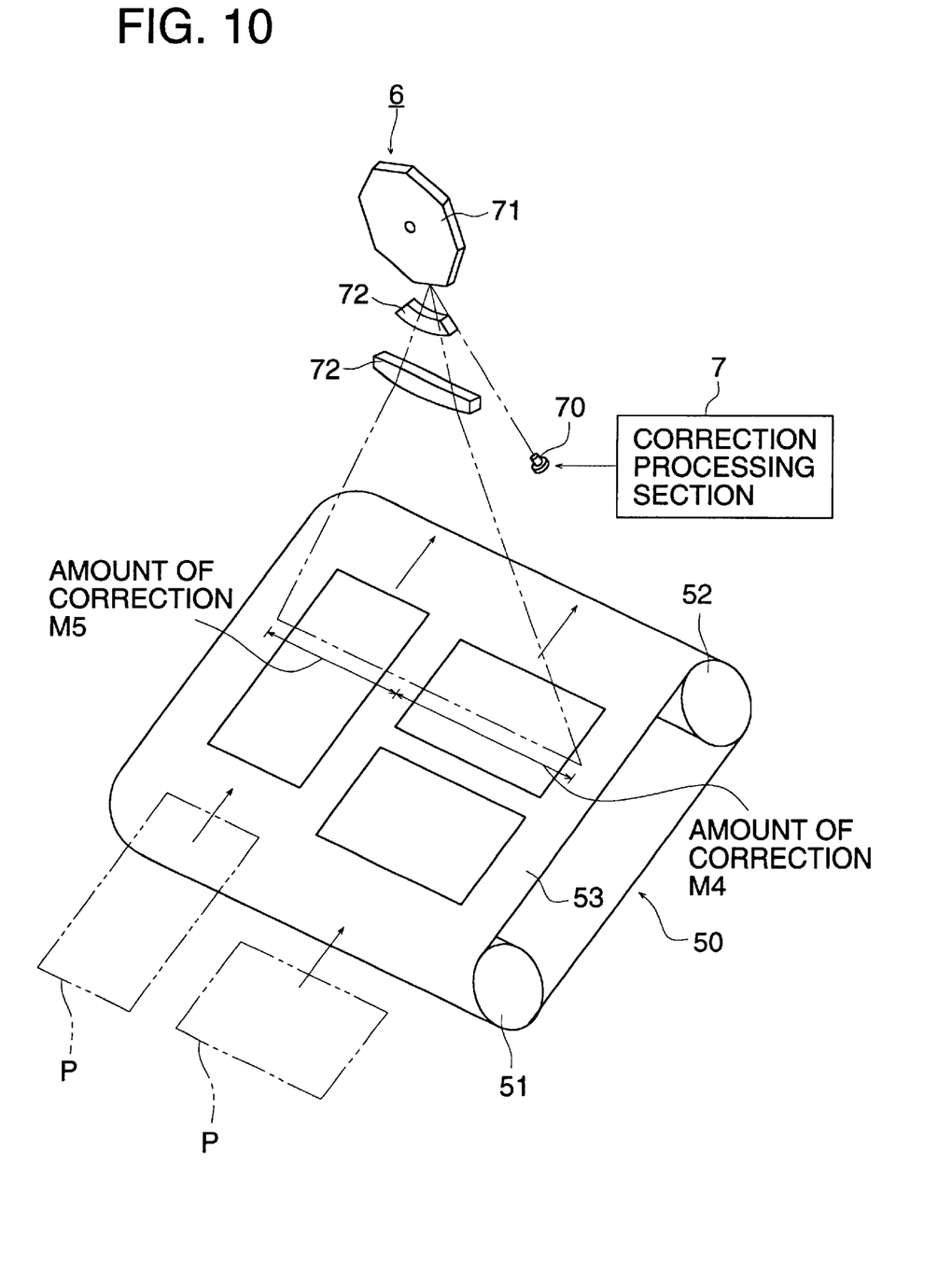
FIG. 10 is a schematic structure diagram of an image forming apparatus showing an embodiment in laser exposure.

FIG. 10 is a schematic structure diagram of an image forming apparatus showing an embodiment in laser exposure. In image forming apparatus 1 of the present embodiment, light-sensitive materials P1 and P2 fed out of two unillustrated magazines respectively and cut into sheets are conveyed to conveyance system 50. The conveyance system 50 is composed of paired conveyance rollers 51 and 52 and conveyance belt 53 which is trained about the conveyance rollers. Light-sensitive materials P in two rows are exposed by single image exposure section 6 at a prescribed position on the conveyance belt 53.

In the image exposure section 6, a laser beam emitted from laser light source 70 is deflected by polygon mirror 71 rotating at constant speed and is caused by fθ lens 72 to form images on light-sensitive materials P on two rows at constant speed. The laser light source 70 is controlled by correction processing section 7, and explanation of this control will be omitted because it is the same as that in each of examples in FIG. 1–FIG. 7. Incidentally, as a control system by means of the correction processing section 7, voltage and current of the power supply for the light source may be changed in accordance with exposure areas, in addition to converting image data and conveying to the exposure section as stated above.

Incidentally, the number of magazines and the number of roll-shaped light-sensitive materials loaded in the magazines do not necessarily need to be in accord with each other. For example, in some systems, two roll-shaped light-sensitive materials are loaded in a magazine. In this case, it is preferable to give information related to exposure position such as the number of rolls from the right or from the left, or the number of rolls from the innermost recess or from this side to the discrimination information, because the discrimination information on the magazine alone can not tell the specific roll from which the print for set-up use comes.

As stated above, in the structure of Item 1, when plural correction amounts to be established based on characteristics of light-sensitive materials are stored, and correction is made based on the correction amount in accordance with an exposure area so that a quantity of light at the exposure section may be influenced, correction for each row is possible while keeping high efficiency of an image forming apparatus such as a printer even when a light-sensitive material to be exposed in each row is different from others. Therefore, excellent prints can be obtained in each row, and even when a slight difference in light-sensitive coloring characteristics exists or is caused despite the same type of a light-sensitive material, it is possible to obtain prints wherein the slight difference in light-sensitive coloring characteristics is eliminated and quality is stabilized.

In the structure of Item 2, the image exposure section can be made simple by making the correction with which a quantity of light is influenced by a correction processing section through conversion of image data based on the correction amount, rather than by correcting a quantity of light of a light source directly. Further, even when sizes or the number of the exposure areas to which different correction amounts are to be applied are changed, it is possible to cope with it without changing the structure of the image exposure section.

In the structure of Item 3, plural magazines each housing a light-sensitive material are provided, and an exposure area is determined in accordance with a position of the mounted magazine. It is therefore unnecessary to detect a width of each light-sensitive material and to set an exposure area to which a correction amount is to be applied. For example, the structure of an apparatus can be made simple by the arrangement wherein when two magazines are set for the maximum area where exposure is possible in an image exposure section, the exposure section is divided into two exposure areas so that a correction amount is applied to each of the two exposure areas.

In the structure of Item 4, discrimination information and a correction amount are stored to be corresponded each other in a memory section, and the correction amount is set in accordance with an exposure area based on the discrimination information read by a discrimination information reading means, which, therefore, makes discrimination information on a magazine in which a light-sensitive material is loaded to be corresponded to the correction amount. Therefore, even when a magazine is used by changing a row in which the magazine is to be set, or when a light-sensitive material is switched to that of a wide type or to that of a narrow type, the prescribed exposure area can be set to the prescribed correction amount immediately, which improves work efficiency. Incidentally, when the discrimination information stated above is made to be that including information of widths of light-sensitive materials and types of magazines, for example, information including types such as a magazine for single-row exposure, a magazine for two-row exposure, or a magazine for three-row exposure, it is possible to simplify the setting of the exposure area to which the correction amount corresponding to the magazine is to be applied, which is preferable.

In the structure of Item 5, even when correction amounts are obtained simultaneously from prints of light-sensitive materials in plural rows, correspondence between a magazine and a print is not mistaken, and setting of wrong correction amount can be prevented.

In the structure of Item 6, density information on a print for calculating a correction amount and information based on discrimination information are optically read, and thereby, the correction amount is calculated based on the density information, and the discrimination information and the correction amount are stored in a memory section to be corresponded. It is therefore possible to cause the correction amount based on the density information and the discrimination information to correspond to each other automatically, which further prevents errors in setting up.

In the structure of Item 7, exposure is controlled so that light-sensitive materials in the same row are exposed to plural images set to be of the same finish. Therefore, even when there is a slight difference in light-sensitive coloring characteristics of light-sensitive materials in plural rows, it is possible to provide uniform prints wherein delicate difference in shade and density difference of finished prints are eliminated, when there is a requirement for making plural prints from the same image.

In the structure of Item 8, it is possible to provide uniform prints wherein slight difference of light-sensitive characteristics is eliminated when making plural prints from the same image, when printing approximate scenes wherein images are alike, and when images are those obtained through continuous photographing.

In the structure of Item 9, an operator of an image forming apparatus can set the same finish on images, and it is possible, for example, to make prints wherein how the apparatus is used is taken into consideration, thus, it is possible to attain improvement of print quality while maintaining production efficiency.

In the structure of Item 10, it is possible to obtain collectively the prints required to be of the same finish out of a large number of prints, and thereby to improve efficiency of the print arranging work.

In the structure of Item 11, plural correction amounts based on characteristics of light-sensitive materials are stored, the correction amount is applied in accordance with an exposure area to a light-sensitive material of an exposure system so that the correction having an influence on a quantity of light of the exposure system may be made to conduct exposure. Therefore, exposure on light-sensitive materials in plural rows makes it possible to correct for each row while keeping high efficiency of an image forming apparatus such as a printer even when exposing light-sensitive materials in each row which are different in terms of type from those in other rows. Therefore, excellent prints can be obtained in each row, and even when a slight difference in light-sensitive coloring characteristics exists or is caused despite the same type of a light-sensitive material, it is possible to obtain prints wherein the slight difference in light-sensitive coloring characteristics is eliminated and quality is stabilized.

In the structure of Item 12, the image exposure section can be made simple by making the correction with which a quantity of light is influenced through conversion of image data based on the correction amount, rather than by correcting a quantity of light of a light source directly. Further, even when sizes or the number of the exposure areas to which different correction amounts are to be applied are changed, it is possible to cope with it without changing the structure of the image exposure section.

In the structure of Item 13, a requirement to make plural prints to be formed to be of the same finish is set, and light-sensitive materials in the same row are exposed to plural images established to be of the same finish. Therefore, even when there is a slight difference in light-sensitive coloring characteristics of light-sensitive materials in plural rows, it is possible to provide uniform prints wherein delicate difference in shade and density difference of finished prints are eliminated, when there is a requirement for making plural prints from the same image.

What is claimed is:

1. An apparatus for forming an image on a plurality of light sensitive materials, comprising;
    an exposing device having an exposing region on which each of the plurality of light sensitive materials in a conveying direction to the exposing region, the plurality of conveyors arranged side by side so that the plurality of light sensitive materials are placed side by side and conveyed in parallel to each other, wherein the exposing region is arranged to be perpendicular to the conveying direction so that the exposing region crosses the plurality of light sensitive materials and is divided into plural exposing sub-regions corresponding in position to the plurality of light sensitive materials:
    a memory to memorize a plurality of correction data each determined based on a characteristic of each of the plurality of light sensitive materials, wherein the plurality of correction data are set separately for each of the plural exposing sub-regions in accordance with the characteristic of a corresponding one of the plurality of light sensitive materials; and
    a correcting section to correct an amount of light at each of the plurality of exposing sub-regions based on a corresponding one of the plurality of correction data.

2. The apparatus of claim 1, further comprising a common conveyor provided between the plurality of conveyors and the exposing region, and to convey the plurality of light sensitive materials simultaneously.

3. The apparatus of claim 1, wherein each of the plurality of light sensitive materials are stored in a corresponding one of plural magazines mounted side by side at positions corresponding to the plurality of conveyors.

4. The apparatus of claim 3, wherein each of the plurality of conveyors feeds out a corresponding one of the plurality of light sensitive materials from a corresponding one of the plural magazines.

5. The apparatus of claim 3, wherein each of the plural magazines is provided with identification code, the apparatus further comprises a reading device to read the identification code, the memory memorizes the identification code in correlation with a corresponding one of the plurality of correction data and the correcting section obtains the corresponding one of the plurality of correction data based on the identification code read by the reading device and sets the corresponding one of the plurality of correction data for the corresponding one of the plural exposing sub-regions.

6. The apparatus of claim 3, wherein the exposing device exposes a test image on a light sensitive material stored in each of the plural magazines and correction data are obtained from the test image on the light sensitive material.

7. The apparatus of claim 6, wherein density levels of the test image are optically read, the correction data are calculated based on the density levels, and the correction data and the identification code are correlated and memorized in the memory.

8. The apparatus of claim 1, wherein the correcting section converts image data for each of the plural exposing sub-regions on the basis of the corresponding one of the plurality of correction data so as to regulate the amount of light.

9. The apparatus of claim 1, further comprising:
    a finish setting section to set a same finish request to make plural images on plural light sensitive materials with the same finish; and
    a control section to control the exposing device to expose the plural images to be made with the same finish on a light sensitive material conveyed by the same one of the plurality of conveyors.

10. The apparatus of claim 9, wherein the same finish request is made based on one of print sheet number information, approximate scene information and continuous photographing scene information.

11. The apparatus of claim 9, wherein the finish setting section includes an input device to input the same finish request.

12. The apparatus of claim 9, further comprising:
    a sorting device including a device to collect the plural light sensitive materials with the same finish at a predetermined position.

13. The apparatus of claim 1, wherein the exposing device comprises an array light source in which a plurality of light emitting elements are aligned along a line and the plurality of light emitting elements are divided so as to form the plural exposing sub-regions.

14. The apparatus of claim 1, wherein the plurality of conveyors are constructed to convey to a large size light sensitive material cooperatively.

15. A method of forming an image on a plurality of light sensitive materials, comprising:
    placing a plurality of light sensitive materials side by side at positions corresponding to a plurality of conveyors arranged side by side:
    conveying the plurality of light sensitive materials in parallel to each other by the plurality of conveyors in a conveying direction to an exposing device; wherein the exposing device has an exposing region on which each of the plurality of light sensitive materials is exposed with light to form an image, and wherein the exposing region is arranged to be perpendicular to the conveying direction so that the exposing region crosses the plurality of light sensitive materials and is divided into plural exposing sub-regions corresponding in position to the plurality of light sensitive materials;
    memorizing plural correction data each determined based on a characteristic of each of the plurality of light sensitive materials, wherein the plurality of correction data are set separately for each of the plural exposing sub-regions in accordance with the characteristic of a corresponding one of the plurality of light sensitive materials: and
    correcting an amount of light at each of the plurality of exposing sub-regions based on a corresponding one of the plurality of correction data.

16. The method of claim 15, wherein image data for each of the plural exposing sub-regions are converted on the basis of the corresponding one of the plurality of correction data so as to regulate the amount of light.

17. The method of claim 15, further comprising:
    setting a same finish request to make plural images on plural light sensitive materials with the same finish; and
    controlling the exposing device to expose the plural images to be made with the same finish on the light sensitive materials at the same one of the plural exposing sub-regions.

* * * * *